(12) United States Patent
Schilling et al.

(10) Patent No.: US 11,524,805 B2
(45) Date of Patent: Dec. 13, 2022

(54) SHRINK-WRAPPING ARRANGEMENT FOR SHRINK WRAPPING CONTAINERS OR PACKAGES, INCLUDING BOTTLES, BOXES, CANS, OR SIMILAR CONTAINERS OR PACKAGES, AND A METHOD OF OPERATING A SHRINK-WRAPPING ARRANGEMENT

(71) Applicants: Christian Schilling, Diemelsee (DE); Martin Thyssen, Kleve (DE)

(72) Inventors: Christian Schilling, Diemelsee (DE); Martin Thyssen, Kleve (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 17/154,385

(22) Filed: Jan. 21, 2021

(65) Prior Publication Data

US 2021/0139178 A1    May 13, 2021

Related U.S. Application Data

(63) Continuation-in-part of application No. PCT/EP2019/067966, filed on Jul. 4, 2019.

(30) Foreign Application Priority Data

Jul. 24, 2018    (DE) .......................... 102018117842.5

(51) Int. Cl.
  *B65B 53/06*    (2006.01)
  *B65G 45/02*    (2006.01)
(52) U.S. Cl.
  CPC ............ *B65B 53/063* (2013.01); *B65G 45/02* (2013.01)

(58) Field of Classification Search
  CPC ... B65B 53/063; B65B 2210/10; B65G 45/02; B65G 45/08
  See application file for complete search history.

(56) References Cited

U.S. PATENT DOCUMENTS

| | | | |
|---|---|---|---|
| 2,548,739 A | 4/1951 | Peck | |
| 2,670,069 A | 2/1954 | Dobkin | |
| 2,720,941 A | 10/1955 | Carson | |
| 3,456,578 A | 7/1969 | Pinsly | |
| 5,337,884 A | 8/1994 | Hoffman | |
| 6,689,180 B1 | 2/2004 | Liao | |
| 7,155,876 B2* | 1/2007 | VanderTuin | B65B 61/12 34/216 |
| 7,811,084 B2* | 10/2010 | Huang | B29C 63/423 53/442 |
| 8,387,776 B2* | 3/2013 | Buchkremer | B65G 43/00 184/15.3 |

(Continued)

FOREIGN PATENT DOCUMENTS

| | | |
|---|---|---|
| DE | 602006000274 T2 | 11/2008 |
| EP | 3081499 A1 | 10/2016 |

(Continued)

*Primary Examiner* — Mark A Deuble
(74) *Attorney, Agent, or Firm* — Myers Duffy Dansak & Clegg LLC (57) ABSTRACT

A shrink-wrapping arrangement can be used for shrink wrapping containers or packages, including bottles, boxes, cans, or similar containers or packages, and a method of operating a shrink-wrapping arrangement can be used for shrink wrapping containers or packages, including bottles, boxes, cans, or similar containers or packages.

20 Claims, 5 Drawing Sheets

(56) References Cited

U.S. PATENT DOCUMENTS

| | | | |
|---|---|---|---|
| 9,032,696 B2* | 5/2015 | Schilling | B65B 53/06 |
| | | | 53/442 |
| 10,343,849 B2* | 7/2019 | Turck | F16N 29/02 |
| 2007/0137937 A1 | 6/2007 | Citro | |
| 2011/0067978 A1* | 3/2011 | Carman | B65G 45/22 |
| | | | 198/495 |

FOREIGN PATENT DOCUMENTS

| | | |
|---|---|---|
| WO | 2005047146 A1 | 5/2005 |
| WO | 2008031176 A1 | 3/2008 |

\* cited by examiner

SHRINK-WRAPPING ARRANGEMENT FOR SHRINK WRAPPING CONTAINERS OR PACKAGES, INCLUDING BOTTLES, BOXES, CANS, OR SIMILAR CONTAINERS OR PACKAGES, AND A METHOD OF OPERATING A SHRINK-WRAPPING ARRANGEMENT

CROSS-REFERENCE TO RELATED APPLICATIONS

The present application is a Continuation-in-Part of International Patent Application No. PCT/EP2019/067966, filed Jul. 4, 2019, which claims the benefit of Federal Republic of Germany Patent Application No. DE 102018117842, filed Jul. 24, 2018, each of which is incorporated by reference herein in its entirety.

BACKGROUND INFORMATION

1. Technical Field

The present application relates to a shrink-wrapping arrangement for shrink wrapping containers or packages, including bottles, boxes, cans, or similar containers or packages. The present application also relates to a method of operating a shrink-wrapping arrangement for shrink wrapping containers or packages, including bottles, boxes, cans, or similar containers or packages.

2. Background Art

This section is for informational purposes only and does not necessarily admit that any publications discussed or referred to herein, if any, are prior art.

Shrink-wrapping arrangements or machines are used in the packaging industry, such as in container-filling or bottling plants, for shrink wrapping individual containers or packages, including bottles, boxes, cans, or similar containers or packages, or groups of such containers or packages. Such packages or containers are used to hold a variety of consumer products, including, but not limited to, foods and beverages. Shrink-wrapping arrangements comprise, in part, a shrink tunnel arrangement or shrink tunnel, which is a tunnel-shaped structure comprised of an elongated housing and an opening or passage way running through the housing. The shrink tunnel comprises a transport arrangement or conveyor arrangement or transport device or conveyor that moves containers or packages or groups of containers or packages through the shrink tunnel. Such shrink tunnels can be used in conjunction with container processing machines from the beverage industry for the shrink wrapping of shrink-wrapping material onto products, such as, for example, packaging units, bottles, or cans, into groups, such as, for example, bundles of several individual packages or packaging units.

The transport devices are in the form of circulating conveyors or belts, so-called endless conveyors, that form a closed line or loop and are usually continuously driven without stopping. In operation, packages or packaging units are first placed on the surface of the conveyor. As the conveyor moves forward in the transport direction, it carries the packages into the shrink tunnel. As the packages are moved through the transport region or shrinking area of the shrink tunnel, the shrink wrap material is shrunk onto the packages. After completion of the shrink wrapping process, the packages are moved out of the shrink tunnel by the conveyor, at which point the packages are moved off of the conveyor to another transport device. The conveyor then continues to circulate, such that the portion that was supporting the packages now moves down and backwards in a return direction, opposite the transport direction, underneath the transport region of the shrink tunnel. The conveyor circulates in this manner, such that an upper portion is moving in the transport direction through the transport region or shrinking area of the shrink tunnel with packages supported thereon, while a lower portion is moving in the return direction under the transport region.

When the packages or packaging units or bundles enter the shrink tunnel, they are loosely enveloped in shrink wrap material. As the packages are transported through the shrink tunnel, this loose shrink wrap material is shrunk onto the packages in tight contact. The shrinking is accomplished by heating the shrink wrap material using a heating medium, such as heated gas or air. The transport device or conveyor is also heated as it runs through the shrink tunnel, such that the temperature of the transport device is higher after it passes through the shrink tunnel than when it first enters the shrink tunnel. The transport device is usually made of metal or a metallic material, and can be in the form of a wire mesh or interlocking plates or sections. Unfortunately, because of the elevated temperature of the conveyor, the shrink wrap material, which can be in the form of a thin film or sheet, can sometimes adhere or stick to the metallic portions of the conveyor. This sticking can cause damage to the shrink wrap material, thereby resulting in a damaged package. In addition, when portions of the shrink wrap material stick to the conveyor, the containers within the loosely-wrapped shrink wrap material can sometimes move or slide or slip out of a desired or predetermined position within the shrink wrap material before the shrink wrap material is tightly shrunk onto the containers.

One possible way to address these issues is to spray the conveyor with a lubricant or lubricating material, such as an oil or similar material. The lubricant which is used serves to prevent the shrink film from sticking on or to the heated or hot metal surfaces of the conveyor. However, the spraying can result in very uneven distribution of the oil on the surface of the conveyor, such that shrink film may still adhere to some portions of the conveyor. In addition, the spraying can be very inefficient in that a very large amount of lubricant is lost due to overspray, wherein lubricant is sprayed beyond the conveyor and into the surrounding area. Not only does this overspray waste lubricant, it can also cause contamination of portions of the shrink tunnel and the surrounding area and any adjacent machinery.

BRIEF SUMMARY

An object of the present application is to provide a shrink tunnel for the shrinking of shrink films onto packages or packaging units which reliably avoids the disadvantages described herein, specifically the adherence of the shrink film to a transport device of a transport arrangement, and therefore allows for the shrinking of shrink films onto packages or packaging units without disturbance or interruption.

The object is achieved by a shrink tunnel for the shrinking of shrink films onto packages or packaging units in accordance with at least one possible embodiment disclosed herein or in the claims. Also disclosed herein is a corresponding lubricating apparatus or lubrication device for use with a shrink tunnel. Further disclosed herein is a corresponding method for applying a lubricant.

According to a first aspect, a shrink tunnel for the shrinking of a shrink tunnel onto packages or packaging units along a transport direction comprises at least one transport device with a belt-like transport device or conveyor. It is understood that the shrink tunnel as disclosed herein is a part of a system or, more precisely, a part of a shrink system or shrink arrangement. Shrink tunnels and shrink systems are commonly used in the packaging industry and utilize several similar components and structures, which will not be discussed in any detail herein.

The belt-like transport device comprises a transport portion for transporting the packages or packaging units along the transport direction through the shrink tunnel and a return portion for returning the belt-like transport device counter to the transport direction. The belt-like transport device therefore forms a kind of closed line or loop and is advantageously continuously driven. The transport portion of the belt-like transport device, technically also known as the feed strand, moves through the hot zone, the actual shrink zone, of the shrink tunnel, and the return portion for the return of the belt-like transport device, technically also known as the return strand, is guided back in a return area underneath the hot zone of the shrink tunnel.

While the transport device is comprised of one continuous loop with no individual sections or portions, during operation it can be divided at any given moment into two main portions: the transport portion or feed portion or feed strand moving through the shrink tunnel in the transport direction, and the return portion or return strand moving in the return direction opposite the transport direction through a return area of the shrink-wrapping arrangement under the shrink tunnel. The sections or portions or parts of the conveyor that make up the transport portion and return portion are always changing as the conveyor circulates, so the transport portion is the portion of the conveyor in the shrink tunnel at a given moment and the return portion is the portion of the conveyor in the return area at that same moment. However, for ease of description, the phrases "transport portion," "feed portion," "feed strand," or other such phrases should be understood to refer to any portion of the conveyor in the shrink tunnel at a given time or moment, and the phrases "return portion," "return strand," or other such phrases should be understood to refer to any portion of the conveyor in the return area at the given time or moment.

The shrink tunnel according to one possible embodiment comprises at least one lubrication device for uniformly applying a lubricant onto the return portion of the belt-like transport device in the return area of the shrink-wrapping arrangement.

The lubricant which is to be applied onto the belt-like transport device is an oil or similar lubricating material. The oil can be a synthetic oil, such as a silicone oil or Teflon oil. The lubricant could also be a mixture of different oils, such as, for example, a mixture of silicone oil and Teflon oil.

According to one possible embodiment, the at least one lubrication device comprises, for uniformly applying a lubricant onto the belt-like transport device, at least one roller rotating about an axis. It is understood that the at least one lubrication device can also comprise more than one roller rotating about an axis, without thereby departing from the concept of the invention.

According to a another possible embodiment, the at least one lubrication device comprises a liquid container, which is configured so as to receive and accommodate the lubricant. At least a part of at least one roller is positioned to project into the liquid container in such a way that, as the at least one roller rotates about the axis, a part of the lubricant adheres to the at least one roller, and, on contact with the belt-like transport device, can be transferred onto this. This means that the at least one roller extends with its lower part of its circumference, as viewed along its rotational axis, into the liquid container, and comes in contact there with the lubricant present in the liquid container. A part of the lubricant therefore remains adhered to the at least one roller and is carried along by it until the at least one roller comes in contact onto the surface of the belt-like transport device. The lubricant is then transferred from the at least one roller onto the surface of the transport device.

By monitoring the height of a filling level, or by monitoring a volume content of the lubricant in the liquid container, a quantity of the lubricant being transferred onto the belt-like transport device can be determined. In other words, it is by the height of the filling level or by the volume content of the lubricant in the liquid container that the quantity of the lubricant being transferred onto the belt-like transport device can be influenced. In this way, for example, with a high filling level or a more substantial volume content of lubricant in the liquid container, more lubricant will be transferred onto the belt-like transport device than with a lower filling level or lesser volume content of the lubricant in the liquid container.

In order, for example, to reduce the quantity of lubricant transferred onto the belt-like transport device still further, provision can be made for the filling level or the volume content of the lubricant in the liquid container to be lowered in a controlled manner, such that the at least one roller has only minimal contact with the lubricant, or even no contact at all. This is then of advantage if, for example, the belt-like transport device is still exhibiting lubricant from a previous application. In other words, if the conveyor has an amount of lubricant thereon sufficient to minimize adherence of shrink film, the filling level or volume content of the lubricant can be lowered so that the at least one roller has little or no contact with the lubricant, and thus little to no additional lubricant will be added to the conveyor. This avoids applying too much lubricant to the conveyor and thereby wasting lubricant and/or making the surface of the conveyor slippery.

According to another embodiment, the liquid container is connected to an electro-pneumatic lubricant pump, by which the liquid container can be automatically refilled with lubricant.

A programmable controller system can also be provided for controlling the refilling of the lubricant into the liquid container, by which the refilling of the lubricant by the lubricant pump into the liquid container can be carried out fully automatically. By using the programmable controller system, different time intervals for the fully-automatic refilling of the lubricant into the liquid container can be adjusted and can be stored in the system.

According to another possible embodiment, provision is made for an automatic filling level monitoring device and/or filling level regulating device, for monitoring and/or regulating the filling level of the lubricant in the liquid container, such that a controlled and/or regulated refilling or lowering of the lubricant into or out of the liquid container can be carried out.

At least two metering valves can be used for the automatic refilling and/or lowering of the lubricant into or out of the liquid container, wherein the refilling of the lubricant takes place by way of a delivery line and the lowering of the lubricant by way of a return line.

According to another embodiment, a width of the at least one roller corresponds to at least a width of the belt-like transport device. This ensures that the lubricant is applied onto the entire width of the belt-like transport device, but subject to the precondition that the at least one roller is permanently or continuously in contact with the surface which is to be wetted of the horizontally-moving belt-like transport device. By using such a roller, a uniform distribution of the lubricant onto large surface areas of the belt-like transport device is possible, such that an adherence or sticking of the shrink film on the belt-like transport device is reliably minimized or avoided. Further or alternative embodiment variants can also be provided with which more than one roller is provided in the shrink tunnel. In this way it is conceivable, for example, that two rollers or more are arranged one behind another in the return area. The use of multiple rollers therefore ensures or promotes that lubricant is reliably applied to every part of the belt-like transport device. It is also likewise conceivable, however, that two or more rollers are provided over the width of the belt-like transport device. Also likewise conceivable is a combination of both the possibilities described above, in a further embodiment variant. The possibilities for arranging the at least one roller are therefore multiple. Regardless of the number of rollers used, each should be at least the width of the belt-like transport device.

According to another embodiment, a force, such as a force incurred by a pre-tensioned spring arrangement, takes effect on the at least one roller in such a way that the at least one roller is pressed against the belt-like transport device, such that, at a movement of the belt-like transport device, the at least one roller is likewise set in motion. The pressing force causes a frictional engagement so that the at least one roller and the belt move together, wherein the belt rotates the at least one roller without the need for a separate drive for the at least one roller. It should be understood that any tensioning arrangement or pressing arrangement can be used to press the roller against the transport device. In at least one possible embodiment, a pressing force could be applied to the transport device to bias or press the transport device or belt against the at least one roller.

If the at least one roller is now permanently pressed with a sufficiently great force against the belt-like transport device, the at least one roller will necessarily then always be moved when the belt-like transport device is moved. With this embodiment variant, the at least one roller is essentially driven directly by the belt-like transport device, or moved with it, such that, with this variant, no separate drive is required for the at least one roller.

According to another possible embodiment, the at least one roller is connected to an electro-motor drive, such that, for example, the spring arrangement provided for in the previous embodiment variant is not necessary. Likewise, in a further alternative embodiment it is conceivable that both a force, such as by the pre-stressed spring arrangement, takes effect on the at least one roller, and, likewise, the at least one roller is connected to an electro-motor drive. This can then be of advantage in particular if, for example, the pre-stressed spring arrangement loses its spring force, and this must first be replaced by a new appropriate pre-tensioned spring arrangement, and during this time a corresponding electro-motor drive then sets the roller in motion. In other words, the electro-motor drive can serve as a backup to rotate the at least one roller in the event that the biasing or pressing device, such as the spring, does not provide sufficient pressing force to maintain the at least one roller in contact with the transport belt. The electro-motor drive would therefore be provided as an auxiliary drive, which could thereby prevent or minimize the shrinking system stopping or coming to a standstill in the event of failure or malfunction by the spring or similar pressing device.

According to another embodiment, the at least one roller is covered with a felt material and is formed in the shape of a compression roll.

According to another embodiment, the belt-like transport device exhibits a metallic surface. For example, the belt-like transport device with a metallic surface is a wire mesh belt, wherein, however, all other transport devices with a metallic surface are also conceivable, which, like wire mesh belts, are suitable for operating in a high temperature range with simultaneously a very high tensile loading.

According to another embodiment, a lubrication device can be used with or as part of a shrink tunnel for the simultaneous application of a lubricant onto a belt-like transport device of a transport arrangement of the shrink-wrapping arrangement. It should be understood that the phrase "simultaneous application" when used to describe the application of lubricant refers to the application of lubricant while the belt-like transport device is moving or in motion, that is, simultaneous to the movement of the belt-like transport device. The belt-like transport device comprises a transport portion for the transport of the packages or packaging units along a transport direction through the shrink tunnel, and a return portion for returning the belt-like transport device counter to the transport direction. According to at least one embodiment, the lubrication device is configured to apply lubricant onto the return portion of the belt-like transport device while the return portion simultaneously moves through a return area of the shrink-wrapping arrangement.

According to another embodiment, the at least lubrication device comprises, for the simultaneous application of a lubricant onto the belt-like transport device, at least one roller rotating about an axis.

According to another embodiment, the at least one lubrication device comprises a liquid container, which is configured for the receiving and accommodating of the lubricant, and into which at least a part of the at least one roller projects, in such a way that, at a rotation of the at least one roller about the axis, a part of the lubricant adheres to the at least one roller, and, on contact with the belt-like transport device, can be transferred to the belt-like transport device.

According to another embodiment, a method can be performed for the simultaneous application of a lubricant onto a belt-like transport device of a shrink-wrapping arrangement. The shrink-wrapping arrangement comprises at least one lubrication device that is used for the simultaneous application of the lubricant onto the belt-like transport device in a return area of the belt-like transport device according to the foregoing description. By the simultaneous or essentially simultaneous application of the lubricant onto the moving belt-like transport device, ideally no or essentially no shrink film will adhere any longer to the belt-like transport device during a shrink wrapping process, wherein the belt-like transport device is a constituent part of the shrink-wrapping arrangement.

In addition, by the specific application of the lubricant with the at least one roller onto the belt-like transport device, loss or waste of lubricant is minimized or avoided. In addition to the advantage of the low lubricant losses, this variant additionally has the advantage in relation to the spraying of lubricant, which has long been conventional and known from the prior art, that no spray mist escapes into the surrounding environment any longer, such that, by the invention, the area surrounding the shrink tunnel, and the entire shrink system, remains clean. Likewise, the risk that the lubricant, during spraying, will pass into the respiratory passages of an operator of the systems is circumvented by the direct application of the lubricant by the at least one roller onto the belt-like transport device, such that there are no longer any health considerations in that respect to be taken into account. Due to the fact that the simultaneous application of the lubricant onto the belt-like transport device in the return area can also be regulated fully automatically, the invention allows for the shrinking of shrink film onto packages or packaging units in a shrink tunnel to be carried out free of any disturbance or interruption. In other words, by applying the lubricant to the belt via the at least one roller, specifically by direct contact transfer, spraying of the lubricant is no longer necessary, and thus all of the disadvantages of spraying, such as overspray, unequal distribution of lubricant, and contamination of the surrounding machinery, environment, and personnel, can be minimized or avoided completely.

Further configurations, advantages, and possible applications of the invention are also derived from the following description of exemplary embodiments and from the Figures. In this situation, all the features described and/or figuratively represented are in principle, alone or in any desired combination, an object of the invention, regardless of their compilation in the claims or reference to them, in accordance with at least one possible embodiment.

DETAILED DESCRIPTION

For the elements of the drawings which are the same or similar or produce the same or similar effect or function, identical reference numbers are used in the Figures. Moreover, for easier overview, only reference numbers are represented in the individual Figures which are required for the description of the respective Figure.

Figure 1:
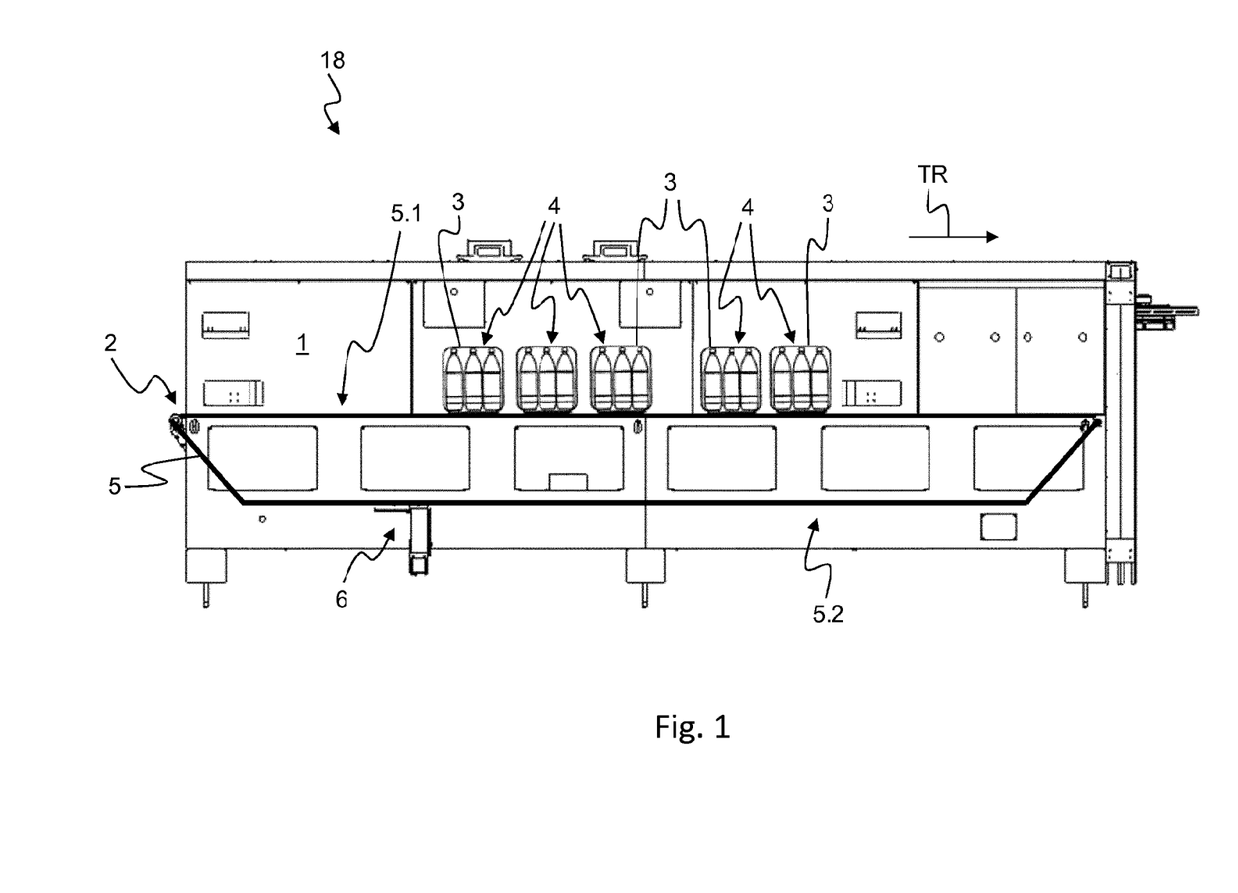
FIG. 1 shows a shrink-wrapping arrangement for wrapping packages and containers, such as bottles, cans, boxes, and similar containers, into groups, bundles, or packaging units.
Figure 2:
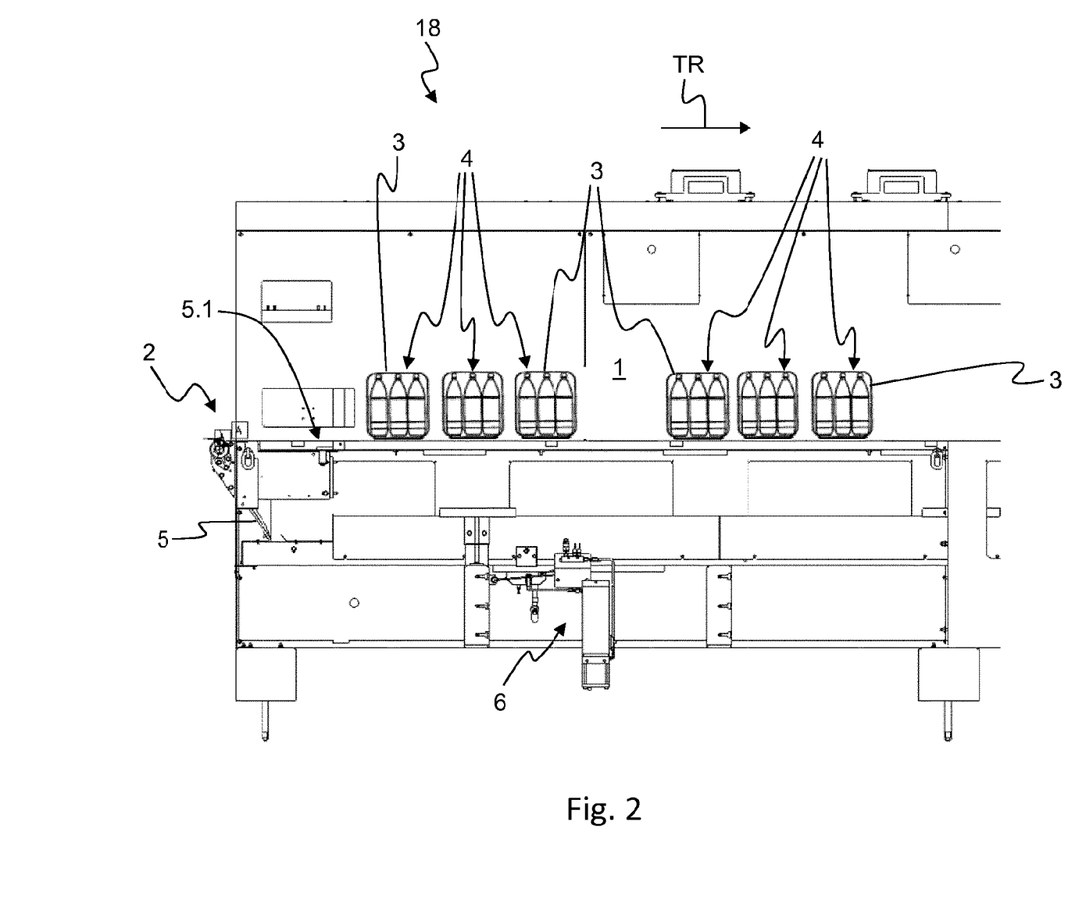
FIG. 2 shows an enlarged side view of a section of the shrink-wrapping arrangement according to FIG. 1, according to at least one possible embodiment.

FIG. 1 shows, by way of example, an embodiment variant of a shrink tunnel 1 for shrinking a shrink film 3 onto packages or packaging units 4 along a transport direction TR of a shrink-wrapping arrangement 18. FIG. 2 also shows a section of the shrink-wrapping arrangement 18 in an enlarged side view according to FIG. 1. The shrinking can be achieved by applying a hot air flow or hot gas flow, for example, laterally onto the respective packaging unit 4, which is already enveloped by the shrink film. Furthermore, the shrink gas flow is also directed onto the under side of the product or containers enveloped in the shrink film 3, in order to seal the overlapping ends of the shrink film 3 located there, wherein, however, all the other shrink-on processes known from the prior art can also be applied with the invention.

Figure 3:
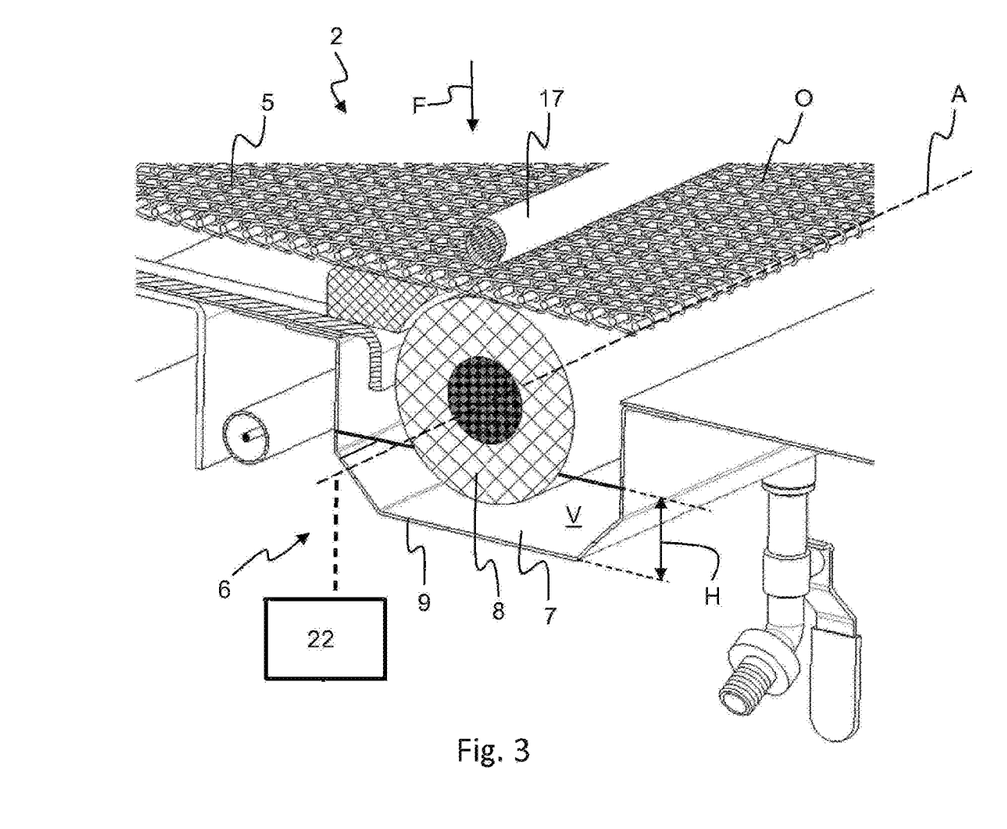
FIG. 3 shows a perspective view of a portion of the shrink-wrapping arrangement according to FIG. 1, according to at least one possible embodiment.

The shrink-wrapping arrangement, according to the embodiment shown in FIG. 1 and in FIG. 2, comprises a transport arrangement 2 with a belt-like or belt-type transport device 5, as well as a lubrication device 6 for the simultaneous application of a lubricant 7 onto the belt-like transport device 5 (see FIG. 3). It is understood that other embodiment variants can also be provided with more than one transport arrangement 2 with a belt-like transport device 5, and also with more than one lubrication device 6, without thereby departing from the concept of the invention.

The belt-like transport device 5 comprises a transport portion 5.1 for the transport of the packages or packaging units 4 along the transport direction TR through the shrink tunnel 1, and a return portion 5.2 for returning the belt-like transport device 5 counter to the transport direction TR, such that the belt-like transport device 5 forms a kind of closed line or loop. As discussed herein above, the transport portion 5.1 refers to any portion of the belt-like transport device 5 located in the shrink tunnel 1 at any given time, whereas the return portion 5.2 refers to any portion of the belt-like transport device 5 located under the shrink tunnel 1 at any given time.

The lubrication device 6 for the simultaneous application of a lubricant 7 onto the belt-like transport device 5 is provided in the return area adjacent the return portion 5.2 or return strand of the belt-like transport device 5. A synthetic oil such as, for example, Teflon oil, is used as lubricant 7, wherein, however, other synthetic oils or similar lubricants can also be used.

Represented in FIG. 3 is an embodiment of a lubrication device 6 according to FIG. 1, in a schematic perspective view. The lubrication device 6 for the simultaneous application of the lubricant 7 onto the belt-like transport device 5 of the transport arrangement 2 comprises in this case, for example, a roller 8 designed to rotate about an axis of rotation A. According to at least one embodiment, the roller 8 is covered with a felt material and is configured in the form of a compression roll. In another possible embodiment, the lubrication device can also comprise more than only one roll 8 for the simultaneous application of the lubricant 7 onto the belt-like transport device 5.

Since the belt-like transport device 5 of the transport arrangement 2 is subjected to high temperatures and a high tensile loading in the shrink tunnel 1 (see FIG. 1 or 2), the belt-like transport device 5 preferably comprises a metallic surface O. The belt-like transport device 5 can therefore be, for example, a wire mesh belt.

As represented here, the lubrication device 6 comprises a liquid container 9, which is configured for receiving and accommodating the lubricant 7, and into which at least a part of the roller 8 projects, in such a way that, at a rotation of the roller 8 about the axis A, a part of the lubricant 7 adheres to or transfers onto the roller 8, and, on contact with the belt-like transport device 5, can be transferred onto the belt-like transport device 5. By way of a height H of a filling level, or by way of a volume content V of the lubricant 7 in the liquid tank 9, a quantity can be determined of the lubricant 7 which is being transferred onto the belt-like transport device 5. Accordingly, for example, with a higher filling level H, or a greater volume content V of the lubricant 7 in the liquid container 9, more lubricant 7 is being transferred onto the belt-like transport device 5 than with a lower filling level or lesser volume content V of the lubricant 7 in the liquid container 9.

According to at least one embodiment, in order for the roller 8 not to be necessarily driven by an electro-motor drive, a force F can be applied to the roller 8, such as a force F incurred or caused to be exerted on the roller 8 by a pre-stressed spring arrangement or biasing arrangement 22. The force F takes effect onto the roller 8 in such a way that the roller 8 is pressed against the belt-like transport device 5, such that, at a movement of the belt-like transport device 5, the roller 8 is likewise set in motion. In this embodiment variant the roller 8 is driven by the belt-like transport device 5.

According to at least one embodiment, the belt-like transport device 5 is pressed by the roller 8 against a rotatable counter-roller 17.

Figure 4:
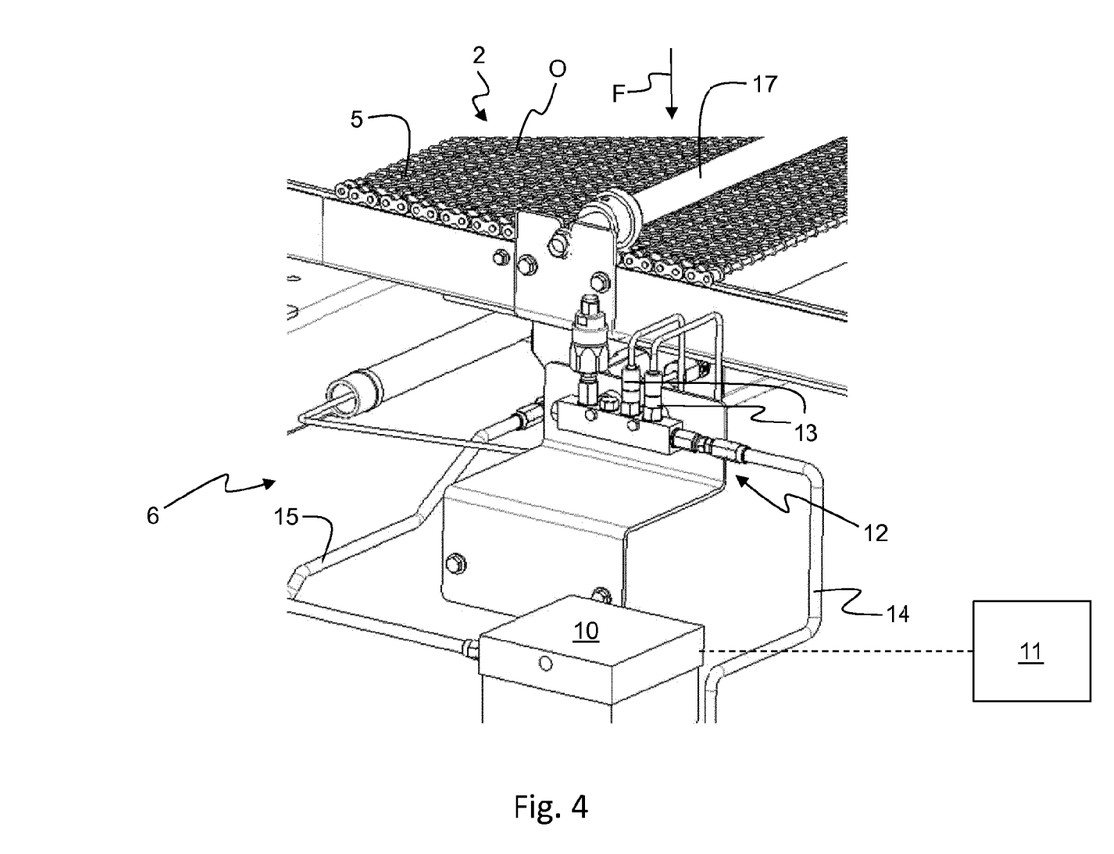
FIG. 4 shows a perspective view of the portion of the shrink-wrapping arrangement according to FIG. 3, according to at least one possible embodiment.

FIG. 4 shows an enlarged perspective view of the lubrication device 6 according to FIG. 3. As represented here, the liquid container 9 (see FIG. 3) is connected, for example, to an electro-pneumatic lubricant pump 10. The liquid container 9 can then be automatically refilled with the lubricant 7 using the electro-pneumatic lubricant pump 10.

A programmable controller system 11 is provided for controlling the refilling of the lubricant 7 into the liquid container 9, such that the refilling of the lubricant 7 by the lubricant pump 10 into the liquid container 9 can be carried out fully automatically. The programmable controller system 11 is configured to be used to adjust and/or store different time intervals for the fully-automatic refilling of the lubricant 7 into the liquid container 9.

According to at least one embodiment, an automatic filling level monitoring device and/or filling level regulating device 12 can be provided for monitoring and/or regulating the filling level of the lubricant 7 in the liquid container 9. The automatic filling level monitoring device and/or filling level regulating device 12 can be used to carry out a controlled and/or regulated refilling or lowering of the lubricant 7 into or out of the liquid container 9.

Figure 5:
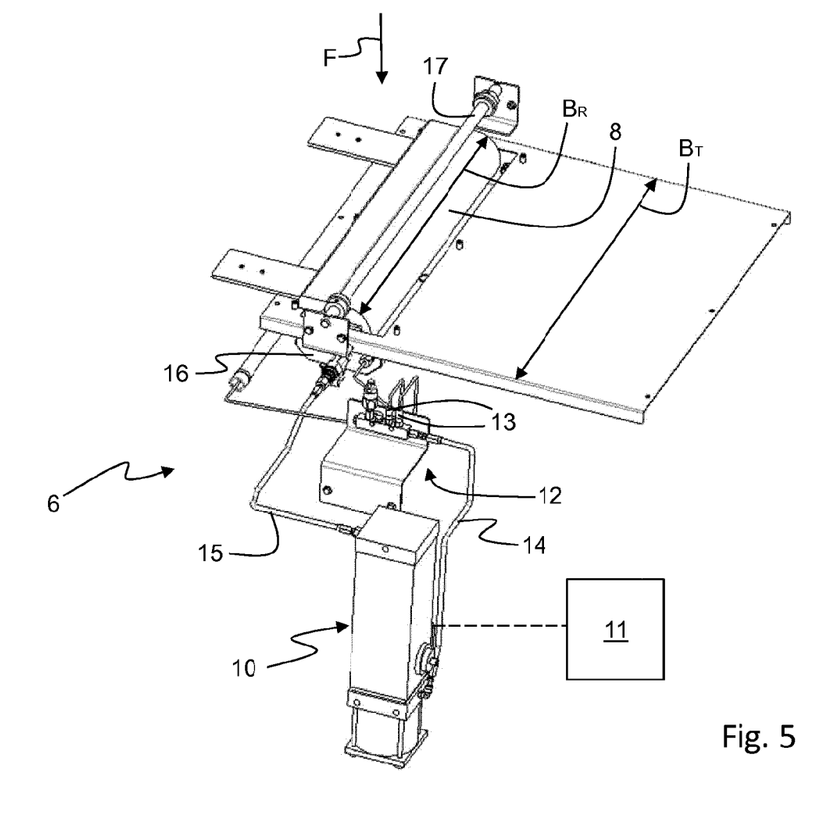
FIG. 5 shows a perspective view of a portion of the shrink-wrapping arrangement according to FIG. 1, according to at least one possible embodiment.

As shown in FIGS. 4 and 5, two metering valves are provided for the automatic refilling and/or lowering of the lubricant 7 into or out of the liquid container 9, wherein the refilling of the lubricant 7 takes place by way of a delivery line 14, and the lowering of the lubricant 7 by way of a return line 15. In other possible embodiments could have more or less than two metering valves 13.

FIG. 5 shows a further embodiment of the lubrication device 6 according to FIG. 1 in a schematic perspective view. As already described in relation to FIG. 3, provision is made here, in addition to a spring arrangement (not shown), an electro-motor drive 16 is provided for the driving of the roller 8. In the event that the pre-stressed spring arrangement at least partially loses its spring force or fails entirely, and therefore must be replaced by a new and appropriately pre-stressed spring arrangement, and the electro-motor drive 16 can be used to set the roller 8 in motion and thereby avoid the need to shut down the shrink tunnel or interrupt the operation thereof.

In at least one possible embodiment, only one electro-motor drive 16 is provided. The electro-motor drive 16 is only shown in the Figures in a very simplified manner.

In at least one possible embodiment, the width BR of the roller 8 corresponds at least to the width BT of the belt-like transport device 5. These similar widths therefore allow for the lubricant 7 (see FIG. 3) to be applied onto the entire width BR of the belt-like transport device 5. In addition, this configuration promotes a uniform or essentially uniform application and/or distribution of the lubricant 7 onto large surface areas of the belt-like transport device 5, such that an adherence or sticking of the shrink film 3 (see FIG. 1 or 2) on the belt-like transport device 5 can be reliably avoided or minimized. In addition, by the application of the lubricant 7 with the roller 8 onto the belt-like transport device 5, losses of lubricant can be almost completely avoided or minimized.

All the reference numbers represented here have already been described in reference to FIGS. 3 and 4, and are therefore to be derived from them.

The invention has been described heretofore by reference to exemplary embodiments. It is understood that a large number of modifications or derivations are possible without thereby departing from the scope of protection of the invention defined by the claims.

According to at least one possible embodiment, the shrinking of the shrink film takes place via a hot air flow or hot gas flow, and is applied, for example, laterally onto the respective packaging unit which has already been enveloped with the shrink film, in order to shrink the shrink film onto the packaging unit. In addition, the shrink gas flow is also directed onto the under side of the product enveloped with the shrink film, in order to seal the overlapping ends of the shrink film located there, i.e. to weld or adhesively bond them.

In this situation, use is made in the shrink tunnels of transport devices with metallic surfaces, such as transport belts in the form of wire mesh belts. These wire mesh belts form a closed line or loop and are continuously or essentially continuously driven. In this situation, the upper part or upper half of the wire mesh belt moving in the transport direction moves through the hot zone, the actual shrink zone, of the shrink tunnel, and then via the return strand of the wire mesh belt, moving counter to the transport direction, back underneath the hot zone of the shrink tunnel.

By use of these transport devices, in a known manner, bundles which are initially only loosely enveloped in shrink film, as a rule polyethylene (PE) film, are transported through the hot shrink zone, as a result of which the shrink film is so substantially shrunk that it contacts tightly against the bundle.

Incurred as a result of the process, the transport belt also heats up as it runs through the shrink zone. In order to keep this heating within tolerable limits or desirable limits, the transport belt is actively cooled on the return run. In practice, before running into the shrink zone the transport belt exhibits a temperature of, for example 80 to 85° C. During its run through the hot shrink zone, the transport belt frequently heats up by 10 to 20° C., such that the transport belt finally reaches temperatures of up to 105° C. The belt temperature before entering the shrink zone could be in the range of approximately 60 to 105° C., or in the range of approximately 70 to 95° C., or approximately 80 to 85° C., including whole numbers or tenths in any of these ranges, such as, for example, 80, 85, 80.2, 82.3, etc. The belt temperature during its run through the hot shrink zone could be in the range of approximately 70 to 125° C., or in the range of approximately 80 to 115° C., or approximately 90 to 105° C., including whole numbers or tenths in any of these ranges, such as, for example, 90, 95, 105, 90.2, 92.3, 102.7, etc. It should be noted that these temperatures, as well as any temperatures mentioned herein, are in accordance with one or more possible embodiments, and should not be considered as limiting the embodiments disclosed herein or in the claims.

A problem at these high temperatures of the transport belts is that some specific shrink films, such as PE films, above certain temperatures have the characteristic of adhering to heated metallic contact surfaces, and effectively stick to these contact surfaces. Since this sticking effect can lead as a rule to a deterioration of the shrink results or even to the slipping of the container arrangement inside the bundle which has not yet fully cooled and is therefore not completely fixed, this adherence of the shrink film to the transport belt is regarded in practice as very disadvantageous.

To solve this problem, the principle is already known of spraying the transport belt with a lubricant. As lubricant, an oil is very frequently used, which is sprayed onto the transport belts by compressed air. The oil which is used serves to prevent or minimize the shrink film sticking on or to the hot metal surfaces of the transport belt.

Disadvantageous with this known solution is the very uneven distribution of the oil on the surface of the transport belt, with the result that an adherence of the shrink film to the transport belt cannot be reliably avoided. Moreover, due to the spraying, or due to what is referred to as overspray, wherein a part of the oil which is to be sprayed which does not pass onto the transport belt but escaped into the surrounding area, a very large amount of lubricant is lost. Likewise, as a result of this overspray, wide areas in the surroundings of the shrink tunnel are contaminated.

This application relates to a shrink tunnel for shrinking shrink film onto packages or packaging units according to the features of at least one of the possible embodiments disclosed herein, to a lubrication device for use with a shrink tunnel according to the features of at least one of the possible embodiments disclosed herein, and to a method for the simultaneous application of a lubricant according to at least one of the possible embodiments disclosed herein.

At least partial list of reference numerals, with reference numeral listed first: 1 Shrink tunnel; 2 Transport arrangement; 3 Shrink film; 4 Package or packaging unit; 5 Transport device; 5.1 Transport portion; 5.2 Return portion; 6 Lubrication device; 7 Lubricant; 8 Roller; 9 Liquid container; 10 Lubricant pump; 11 Programmable control system; 12 Filling level monitoring device and/or filling level regulating device; 13 Metering valve; 14 Delivery line; 15 Return line; 16 Electro-motor drive; 17 Counter-roller; 18 Shrink-wrapping arrangement; A Axis; BR Width of the roller; BT Width of the belt-like transport means; F Force; H Height; 0 Surface; TR Transport direction; V Volume content.

At least one possible embodiment relates to a shrink tunnel 1 for shrinking a shrink film 3 onto packages or packaging units 4 along a transport direction TR, comprising at least one transport arrangement 2 with a belt-like transport device 5 wherein the belt-like transport device 5 comprises a transport portion 5.1 for the transport of packages or packaging units 4 along the transport direction TR through the shrink tunnel 1 and a return portion 5.2 for returning the belt-like transport device 5 counter to the transport direction TR, wherein at least one shrinking apparatus 6 is provided for the simultaneous application of lubricant 7 onto the belt-like transport device 5 in the return portion 5.2 of the belt-like transport device 5.

At least one possible embodiment relates to the shrink tunnel 1, wherein the at least one lubrication device 6 comprises at least one roller 8 rotating about an axis A for the uniform application of a lubricant 7 onto the belt-like transport device 5.

At least one possible embodiment relates to the shrink tunnel 1, wherein the at least one lubrication device 6 comprises a liquid container 9, which is configured for receiving and accommodating the lubricant 7, and into which at least a part of the at least one roller 8 projects, in such a way that, at a rotation of the at least one roller 8 about the axis A, a part of the lubricant 7 adheres to the at least one roller 8, and, on contact with the belt-like transport device 5, can be transferred onto it.

At least one possible embodiment relates to the shrink tunnel 1, wherein according to a height H of a filling level or a volume content V of the lubricant 7 in the liquid container 9, a quantity of the lubricant 7 transferred onto the belt-like transport device 5 can be determined.

At least one possible embodiment relates to the shrink tunnel 1, wherein the liquid container 9 is connected to an electro-pneumatic lubricant pump 10, by which the liquid container 9 can be automatically refilled with the lubricant 7.

At least one possible embodiment relates to the shrink tunnel 1, wherein a programmable control system 11 is provided for controlling the refilling of the lubricant 7 into the liquid container 9, by which the refilling of the lubricant 7 by the lubricant pump 10 into the liquid container 9 can be carried out fully automatically.

At least one possible embodiment relates to the shrink tunnel 1, wherein by the programmable control system 11, different time intervals for the refilling of the lubricant 7 into the liquid container 9 can be adjusted and can be stored in the system.

At least one possible embodiment relates to the shrink tunnel 1, wherein an automatic filling level monitoring device and/or filling level regulating device 12 is provided for the monitoring and/or regulating of the filling level of the lubricant 7 in the liquid container 9, such that a controlled and/or regulated refilling or lowering of the lubricant 7 into or out of the liquid container 9 can be carried out.

At least one possible embodiment relates to the shrink tunnel 1, wherein at least two metering valves 13 are provided for the automatic refilling and/or lowering of the lubricant 7 into or out of the liquid container 9.

At least one possible embodiment relates to the shrink tunnel 1, wherein a width BR of the at least one roller 8 corresponds at least to a width BT of the belt-like transport device 5.

At least one possible embodiment relates to the shrink tunnel 1, wherein a force F, such as a force F induced by a pre-tensioned spring arrangement, takes effect on the at least one roller 8 in such a way that the at least one roller 8 is pressed against the belt-like transport device 5, such that, at a movement of the belt-like transport device 5, the roller 8 is likewise set in motion.

At least one possible embodiment relates to the shrink tunnel 1, wherein the at least one roller 8 is connected to an electro-motor drive 16.

At least one possible embodiment relates to the shrink tunnel 1, wherein the at least one roller 8 is covered with a felt material and is configured as a compression roll.

At least one possible embodiment relates to the shrink tunnel 1, wherein the belt-like transport device 5 comprises a metallic surface O.

At least one other possible embodiment relates to a lubrication device 6 for use with a shrink tunnel 1 for the simultaneous application of a lubricant 7 onto a belt-like transport device 5 of a least one transport arrangement 2 of the shrink tunnel 1, wherein the transport device 5 comprise a transport portion 5.1 for the transport of packages or packaging units 4 along a transport direction TR through the shrink tunnel 1 and a return portion 5.2 for the return of the belt-like transport device 4 counter to the transport direction TR, wherein the lubrication device 6 is provided for the simultaneous application of the lubricant 7 onto the belt-like transport device 5 in the return portion 5.2 of the belt-like transport device 5.

At least one other possible embodiment relates to the lubrication device 6, wherein the at least one lubrication device 6 comprises at least one roller 8 rotating about an axis A for the simultaneous application of a lubricant 7 onto the belt-like transport device 5.

At least one other possible embodiment relates to the lubrication device 6, wherein the at least one lubrication device 6 comprises a liquid container 9, which is configured to receive and accommodate the lubricant 7, and into which at least a part of the at least one roller 8 projects, in such a way that, at a revolution of the at least one roller 8 about the axis A, a part of the lubricant 7 adheres to the at least one roller 8, and, on contact with the belt-like transport device 5, is transferred to it.

At least one further possible embodiment relates to a method for the simultaneous application of a lubricant 7 onto a belt-like transport device 5 of at least one transport arrangement 2 of a shrink tunnel 1, wherein at least one lubrication device 6 is used in the shrink tunnel 1 for the simultaneous application of the lubricant 7 onto the belt-like transport device 5 in a return portion 5.2 of the belt-like transport device 5 according to at least one of the possible embodiments disclosed herein.

At least one possible embodiment of the present application relates to a shrink-wrapping arrangement configured to wrap containers or groups of containers, which containers comprise bottles, cans, boxes, or similar containers, in shrink wrap material, said shrink-wrapping arrangement comprising: a shrink tunnel comprising a tunnel-shaped housing configured to receive containers or groups of containers loosely wrapped in shrink wrap material; a transport arrangement being configured and disposed to transport containers or groups of containers through said shrink tunnel in a transport direction; said transport arrangement comprising a belt-like transport device configured and disposed to move along a path of circulating movement; said belt-like transport device comprising an outer support surface configured to receive and support containers or groups of containers thereon; said belt-like transport device being configured and disposed to move containers or groups of containers in a transport direction into said shrink tunnel, through said shrink tunnel, and out of said shrink tunnel; said shrink tunnel comprising shrinking devices configured and disposed to shrink loosely-wrapped shrink wrap material tightly onto containers or groups of containers being moved in said transport direction through said shrink tunnel by said belt-like transport device; said belt-like transport device being disposed such that, at any time during operation of the shrink-wrapping arrangement, a portion of said belt-like transport device is temporarily disposed in said shrink tunnel to temporarily form a transport portion configured to move in said transport direction with containers or groups of containers supported thereon, and another portion of said belt-like transport is simultaneously temporarily disposed under said shrink tunnel to temporarily form a return portion configured to move in a return direction opposite said transport direction; at least one lubrication device being disposed under said shrink tunnel and adjacent said return portion of said belt-like transport device; and said at least one lubrication device being configured and disposed to contact and apply sufficient lubricant to said outer support surface of said belt-like transport device, upon said return portion of said belt-like transport device being moved in said return direction past said lubrication device, to minimize or prevent adherence of shrink wrap material to said outer support surface of said belt-like transport device.

At least one possible embodiment of the present application relates to the shrink-wrapping arrangement, wherein: said at least one lubrication device comprises at least one roller configured and disposed to rotate about an axis; and said at least one roller is configured to uniformly apply lubricant onto said outer support surface of said belt-like transport device.

At least one possible embodiment of the present application relates to the shrink-wrapping arrangement, wherein: said at least one lubrication device comprises a liquid container configured to receive and hold lubricant; said at least one roller is configured and disposed to project into said liquid container, such that a portion of said at least one roller is immersed in lubricant in said liquid container; said at least one roller comprises an outer portion configured to pick up and retain lubricant upon said outer portion being disposed in lubricant in said liquid container; and said outer portion is configured to transfer lubricant to said outer support surface of said belt-like transport device upon rotation of said at least one roller and movement of said outer portion out of the lubricant in said liquid container and into contact with said outer support surface.

At least one possible embodiment of the present application relates to the shrink-wrapping arrangement, wherein: the shrink-wrapping arrangement further comprises a control arrangement configured to set a fill level and/or a volume content of lubricant in said liquid container that corresponds to a quantity of lubricant to be transferred onto said belt-like transport device by said at least one roller.

At least one possible embodiment of the present application relates to the shrink-wrapping arrangement, wherein: the shrink-wrapping arrangement further comprises a lubricant pump operatively connected to said liquid container and configured to pump lubricant into said liquid container.

At least one possible embodiment of the present application relates to the shrink-wrapping arrangement, wherein: said control arrangement is configured to control said lubricant pump to permit automatic refilling of said liquid container.

At least one possible embodiment of the present application relates to the shrink-wrapping arrangement, wherein: said control arrangement is configured to automatically refill said liquid container in accordance with adjustable time intervals stored in said control arrangement.

At least one possible embodiment of the present application relates to the shrink-wrapping arrangement, wherein: the shrink-wrapping arrangement comprises a fill level device configured to automatically monitor and/or regulate a fill level of lubricant in said liquid container; and said control arrangement is operatively connected to said fill level device to permit a controlled and/or regulated increase and/or decrease of the fill level of lubricant in said liquid container.

At least one possible embodiment of the present application relates to the shrink-wrapping arrangement, wherein: the shrink-wrapping arrangement comprises at least two metering valves configured and disposed to control flow of lubricant into and/or out of said liquid container.

At least one possible embodiment of the present application relates to the shrink-wrapping arrangement, wherein: a width of said at least one roller corresponds at least to a width of said belt-like transport device.

At least one possible embodiment of the present application relates to the shrink-wrapping arrangement, wherein: the shrink-wrapping arrangement further comprises a biasing arrangement comprising a spring or resilient structure; and said biasing arrangement is configured and disposed to exert a biasing force on said at least one roller to press and maintain said at least one roller in frictional engagement with said belt-like transport device, such that, upon movement of said belt-like transport device, said at least one roller is driven in rotational movement by said belt-like transport device.

At least one possible embodiment of the present application relates to the shrink-wrapping arrangement, wherein: the shrink-wrapping arrangement further comprises a drive motor configured to drive said at least one roller.

At least one possible embodiment of the present application relates to the shrink-wrapping arrangement, wherein: said at least one roller is a compression roll, and said outer portion of said at least one roller comprises a felt material.

At least one possible embodiment of the present application relates to the shrink-wrapping arrangement, wherein: said outer support surface of said belt-like transport device comprises metal or a metallic material.

At least one possible embodiment of the present application relates to the shrink-wrapping arrangement, wherein: the shrink-wrapping arrangement further comprises a biasing arrangement comprising a spring or resilient structure; and said biasing arrangement is configured and disposed to exert a biasing force on said at least one roller to press and maintain said at least one roller in frictional engagement with said belt-like transport device, such that, upon movement of said belt-like transport device, said at least one roller is driven in rotational movement by said belt-like transport device.

At least one possible embodiment of the present application relates to the shrink-wrapping arrangement, wherein: said shrinking devices are configured and disposed to directly heat loosely-wrapped shrink wrap material to a temperature sufficient to shrink the shrink wrap material tightly onto containers or groups of containers, and also to indirectly heat said belt-like transport device to a temperature sufficient to promote adherence of shrink wrap material to said heated belt-like transport device, and wherein said at least one lubrication device is configured and disposed to apply an amount of lubricant to said heated belt-like transport device sufficient to minimize or prevent adherence of shrink wrap material to said heated belt-like transport device.

At least one other possible embodiment of the application relates to a shrink-wrapping arrangement lubrication device configured to apply lubricant to an outer support surface of a belt-like transport device of a transport arrangement in a shrink-wrapping arrangement configured to wrap containers or groups of containers, which containers comprise bottles, cans, boxes, or similar containers, in shrink wrap material, which belt-like transport device is configured to move along a path in a circulating movement to move containers or groups of containers in a transport direction into, through, and out of a shrink tunnel configured to shrink loosely-wrapped shrink wrap material tightly onto containers or groups of containers, said lubrication device comprising: at least one roller being configured and disposed to rotate about an axis; said at least one roller being configured to contact and uniformly apply lubricant to an outer support surface of a belt-like transport device upon the belt-like transport device being moved past said lubrication device under a shrink tunnel to minimize or prevent adherence of shrink wrap material to the belt-like transport device upon shrinkage of shrink wrap material by the shrink tunnel; a liquid container being configured to receive and hold lubricant; said at least one roller being configured and disposed to project into said liquid container, such that a portion of said at least one roller is immersed in lubricant in said liquid container; said at least one roller comprising an outer portion configured to pick up and retain lubricant upon said outer portion being disposed in lubricant in said liquid container; and said outer portion being configured to transfer lubricant to the belt-like transport device upon rotation of said at least one roller and movement of the outer portion out of the lubricant in said liquid container and into contact with the belt-like transport device.

At least one further possible embodiment of the present application relates to a method of operating a shrink-wrapping arrangement configured to wrap containers or groups of containers, which containers comprise bottles, cans, boxes, or similar containers, in shrink wrap material, said method comprising: receiving containers or groups of containers loosely wrapped in shrink wrap material into a shrink tunnel comprising a tunnel-shaped housing; transporting containers or groups of containers, using a transport arrangement, into said shrink tunnel, through said shrink tunnel, and out of said shrink tunnel, in a transport direction; said step of transporting comprising moving a belt-like transport device of said transport arrangement along a path of circulating movement, and thereby moving containers or groups or containers supported on an outer support surface of said belt-like transport device; shrinking, using shrinking devices of said shrink tunnel, loosely-wrapped shrink wrap material tightly onto containers or groups of containers while the containers or groups of containers are being moved in said transport direction through said shrink tunnel by said belt-like transport device; after completion of shrinking, moving shrunk container units off of a portion of said belt-like transport device on which said container units are disposed, then moving said portion of said belt-like transport device under said shrink tunnel in a return direction essentially opposite to said transport direction; moving said portion of said belt-like transport device in said return direction toward and past at least one lubrication device disposed under said shrink tunnel; and contacting said portion of said belt-like transport device with said at least one lubrication device while said portion of said belt-like transport device is moving in said return direction and applying sufficient lubricant to said outer support surface of said belt-like transport device to minimize or prevent adherence of shrink wrap material to said outer support surface of said belt-like transport device upon shrinkage of said shrink wrap material by said shrink tunnel.

At least one further possible embodiment of the present application relates to the method of operating a shrink-wrapping arrangement, wherein: said step of shrinking comprises directly heating loosely-wrapped shrink wrap material to a temperature sufficient to shrink the shrink wrap material tightly onto containers or groups of containers, and also indirectly heating said belt-like transport device to a temperature sufficient to promote adherence of shrink wrap material to said heated belt-like transport device, and wherein said step of applying sufficient lubricant comprises applying an amount of lubricant to said heated belt-like transport device sufficient to minimize or prevent adherence of shrink wrap material to said heated belt-like transport device.

At least one further possible embodiment of the present application relates to the method of operating a shrink-wrapping arrangement, wherein: said step of applying lubricant comprises rotating at least one roller of said at least one lubrication device and uniformly applying lubricant to said belt-like transport device with said at least one roller; and the method further comprises exerting a biasing force on said at least one roller with a biasing arrangement comprising a spring or resilient structure, and thereby pressing and maintaining said at least one roller in frictional engagement with said belt-like transport device, such that, upon movement of said belt-like transport device, said at least one roller is driven in rotational movement by said belt-like transport device.

At least one further possible embodiment of the present application relates to the method of operating a shrink-wrapping arrangement, wherein the method further comprises: storing lubricant in a liquid container of said at least one lubrication device, wherein said at least one roller projects into said liquid container, such that a portion of said at least one roller is immersed in the lubricant in said liquid container; setting a fill level and/or a volume content of lubricant in said liquid container that corresponds to a quantity of lubricant to be transferred onto said belt-like transport device by said at least one roller; and changing said fill level and/or said volume content of lubricant in said liquid container to a different fill level and/or a different volume content of lubricant in said liquid container that corresponds to a different quantity of lubricant to be transferred onto said belt-like transport device by said at least one roller during shrink wrapping of containers by the shrink-wrapping arrangement.

The entirety of the appended drawings, including all dimensions, proportions, and/or shapes disclosed thereby or reasonably understood therefrom, are hereby incorporated by reference.

All of the patents, patent applications, patent publications, and other documents cited herein, are hereby incorporated by reference as if set forth in their entirety herein.

The corresponding foreign or international patent applications, as originally filed and as published, from which the present application claims the benefit of priority, are hereby incorporated by reference as if set forth in their entirety herein, as follows: International Patent Application No. PCT/EP2019/067966, filed Jul. 4, 2019, and Federal Republic of Germany Patent Application No. DE 102018117842, filed Jul. 24, 2018.

The following patents, patent applications, patent publications, and other documents cited in the International Search Report dated Sep. 25, 2019, are hereby incorporated by reference as if set forth in their entirety herein, as follows: U.S. Pat. Nos. 2,720,941A; 2,670,069A; 3,456,578A; 6,689,180B1; and EP3081499A1.

Although the invention has been described in detail for the purpose of illustration of any embodiments disclosed herein, including the most practical or preferred embodiments at the time of filing of this application, it is to be understood that such detail is solely for that purpose and that the invention is not limited to such embodiments, but, on the contrary, is intended to cover modifications and equivalent arrangements that are within the spirit and scope of the present application, including the specification and the claims as originally filed, as amended, or as issued. For example, it is to be understood that the present invention contemplates that, to the extent possible, one or more features or components of any disclosed embodiment can be combined with one or more features or components of any other disclosed embodiment.

What is claimed is:

1. A shrink-wrapping arrangement configured to wrap containers or groups of containers in shrink wrap material, said shrink-wrapping arrangement comprising:

a shrink tunnel comprising a tunnel-shaped housing configured to receive containers or groups of containers loosely wrapped in shrink wrap material;

an endless conveyor being configured and disposed to be driven along a path of circulating movement to transport containers or groups of containers through said shrink tunnel in a transport direction;

said endless conveyor comprising an outer support surface configured to receive and support containers or groups of containers thereon;

said endless conveyor being configured and disposed to move containers or groups of containers in a transport direction into said shrink tunnel, through said shrink tunnel, and out of said shrink tunnel;

said shrink tunnel comprising shrink heaters configured and disposed to shrink loosely-wrapped shrink wrap material tightly onto containers or groups of containers being moved in said transport direction through said shrink tunnel by said endless conveyor;

said endless conveyor being disposed such that, at any time during operation of the shrink-wrapping arrangement, a portion of said endless conveyor is temporarily disposed in said shrink tunnel to temporarily form a transport portion configured to move in said transport direction with containers or groups of containers supported thereon, and another portion of said endless conveyor is simultaneously temporarily disposed under said shrink tunnel to temporarily form a return portion configured to move in a return direction opposite said transport direction;

at least one lubrication device being disposed under said shrink tunnel and adjacent said return portion of said endless conveyor; and said at least one lubrication device comprising an applicator configured and disposed to contact and apply sufficient lubricant to said outer support surface of said endless conveyor, upon said return portion of said endless conveyor being moved in said return direction past said lubrication device, to minimize or prevent adherence of shrink wrap material to said outer support surface of said endless conveyor.

2. The shrink-wrapping arrangement as claimed in claim 1, wherein:

said applicator comprises at least one roller configured and disposed to rotate about an axis; and said at least one roller is configured to uniformly apply lubricant onto said outer support surface of said endless conveyor.

3. The shrink-wrapping arrangement as claimed in claim 2, wherein:

said at least one lubrication device comprises a liquid container configured to receive and hold lubricant;

said at least one roller is configured and disposed to project into said liquid container, such that a portion of said at least one roller is immersed in lubricant in said liquid container;

said at least one roller comprises an outer portion configured to pick up and retain lubricant upon said outer portion being disposed in lubricant in said liquid container; and said outer portion is configured to transfer lubricant to said outer support surface of said endless conveyor upon rotation of said at least one roller and movement of said outer portion out of the lubricant in said liquid container and into contact with said outer support surface.

4. The shrink-wrapping arrangement as claimed in claim 3, wherein the shrink-wrapping arrangement further comprises a programmable control arrangement configured to set a fill level and/or a volume content of lubricant in said liquid container that corresponds to a quantity of lubricant to be transferred onto said endless conveyor by said at least one roller.

5. The shrink-wrapping arrangement as claimed in claim 4, wherein the shrink-wrapping arrangement further comprises a lubricant pump operatively connected to said liquid container and configured to pump lubricant into said liquid container.

6. The shrink-wrapping arrangement as claimed in claim 5, wherein said control arrangement is configured to control said lubricant pump to permit automatic refilling of said liquid container.

7. The shrink-wrapping arrangement as claimed in claim 6, wherein said control arrangement is configured to automatically refill said liquid container in accordance with adjustable time intervals stored in said control arrangement.

8. The shrink-wrapping arrangement as claimed in claim 7, wherein:
the shrink-wrapping arrangement comprises a fill level device configured to automatically monitor and/or regulate a fill level of lubricant in said liquid container; and
said control arrangement is operatively connected to said fill level device to permit a controlled and/or regulated increase and/or decrease of the fill level of lubricant in said liquid container.

9. The shrink-wrapping arrangement as claimed in claim 8, wherein the shrink-wrapping arrangement comprises at least two metering valves configured and disposed to control flow of lubricant into and/or out of said liquid container, and a width of said at least one roller corresponds at least to a width of said endless conveyor.

10. The shrink-wrapping arrangement as claimed in claim 9, wherein:
the shrink-wrapping arrangement further comprises a biasing arrangement comprising a spring or resilient structure; and
said biasing arrangement is configured and disposed to exert a biasing force on said at least one roller to press and maintain said at least one roller in frictional engagement with said endless conveyor, such that, upon movement of said endless conveyor, said at least one roller is driven in rotational movement by said endless conveyor.

11. The shrink-wrapping arrangement as claimed in claim 10, wherein the shrink-wrapping arrangement further comprises a drive motor configured to drive said at least one roller.

12. The shrink-wrapping arrangement as claimed in claim 11, wherein:
said at least one roller is a compression roll, and said outer portion of said at least one roller comprises a felt material; and
said outer support surface of said endless conveyor comprises metal or a metallic material.

13. The shrink-wrapping arrangement as claimed in claim 2, wherein:
the shrink-wrapping arrangement further comprises a biasing arrangement comprising a spring or resilient structure; and
said biasing arrangement is configured and disposed to exert a biasing force on said at least one roller to press and maintain said at least one roller in frictional engagement with said endless conveyor, such that, upon movement of said endless conveyor, said at least one roller is driven in rotational movement by said endless conveyor.

14. The shrink-wrapping arrangement as claimed in claim 1, wherein said shrink heaters are configured and disposed to directly heat loosely-wrapped shrink wrap material to a temperature sufficient to shrink the shrink wrap material tightly onto containers or groups of containers, and also to indirectly heat said endless conveyor to a temperature sufficient to promote adherence of shrink wrap material to said heated endless conveyor, and wherein said at least one lubrication device is configured and disposed to apply an amount of lubricant to said heated endless conveyor sufficient to minimize or prevent adherence of shrink wrap material to said heated endless conveyor.

15. A shrink-wrapping arrangement lubrication device configured to apply lubricant to an outer support surface of an endless conveyor in a shrink-wrapping arrangement according to claim 3, configured to wrap containers or groups of containers in shrink wrap material, which endless conveyor is configured to move along a path in a circulating movement to move containers or groups of containers in a transport direction into, through, and out of a shrink tunnel configured to shrink loosely-wrapped shrink wrap material tightly onto containers or groups of containers, said lubrication device comprising:
at least one roller being configured and disposed to rotate about an axis;
said at least one roller being configured to contact and uniformly apply lubricant to an outer support surface of an endless conveyor upon the endless conveyor being moved past said lubrication device under a shrink tunnel to minimize or prevent adherence of shrink wrap material to the endless conveyor upon shrinkage of shrink wrap material by the shrink tunnel;
a liquid container being configured to receive and hold lubricant;
said at least one roller being configured and disposed to project into said liquid container, such that a portion of said at least one roller is immersed in lubricant in said liquid container;
said at least one roller comprising an outer portion configured to pick up and retain lubricant upon said outer portion being disposed in lubricant in said liquid container; and
said outer portion being configured to transfer lubricant to the endless conveyor upon rotation of said at least one roller and movement of the outer portion out of the lubricant in said liquid container and into contact with the endless conveyor.

16. A method of operating a shrink-wrapping arrangement according to claim 1 configured to wrap containers or groups of containers in shrink wrap material, said method comprising:
receiving containers or groups of containers loosely wrapped in shrink wrap material into a shrink tunnel comprising a tunnel-shaped housing;
transporting containers or groups of containers, using an endless conveyor, through said shrink tunnel in a transport direction;
said step of transporting comprising moving said endless conveyor along a path of circulating movement, and thereby moving containers or groups or containers supported on an outer support surface of said endless conveyor;

shrinking, using shrink heaters of said shrink tunnel, loosely-wrapped shrink wrap material tightly onto containers or groups of containers while the containers or groups of containers are being moved in said transport direction through said shrink tunnel by said endless conveyor;

after completion of shrinking, moving shrunk container units off of a portion of said endless conveyor on which said container units are disposed, then moving said portion of said endless conveyor under said shrink tunnel in a return direction essentially opposite to said transport direction;

moving said portion of said endless conveyor in said return direction toward and past at least one lubrication device disposed under said shrink tunnel; and contacting said portion of said endless conveyor with said at least one lubrication device while said portion of said endless conveyor is moving in said return direction and applying sufficient lubricant to said outer support surface of said endless conveyor to minimize or prevent adherence of shrink wrap material to said outer support surface of said endless conveyor upon shrinkage of said shrink wrap material by said shrink tunnel.

17. The method of operating a shrink-wrapping arrangement according to claim 16, wherein said step of shrinking comprises directly heating loosely-wrapped shrink wrap material to a temperature sufficient to shrink the shrink wrap material tightly onto containers or groups of containers, and also indirectly heating said endless conveyor to a temperature sufficient to promote adherence of shrink wrap material to said heated endless conveyor, and wherein said step of applying sufficient lubricant comprises applying an amount of lubricant to said heated endless conveyor sufficient to minimize or prevent adherence of shrink wrap material to said heated endless conveyor.

18. The method of operating a shrink-wrapping arrangement according to claim 17, wherein:

said step of applying lubricant comprises rotating at least one roller of said at least one lubrication device and uniformly applying lubricant to said endless conveyor with said at least one roller; and the method further comprises exerting a biasing force on said at least one roller with a biasing arrangement comprising a spring or resilient structure, and thereby pressing and maintaining said at least one roller in frictional engagement with said endless conveyor, such that, upon movement of said endless conveyor, said at least one roller is driven in rotational movement by said endless conveyor.

19. The method of operating a shrink-wrapping arrangement according to claim 18, wherein the method further comprises:

storing lubricant in a liquid container of said at least one lubrication device, wherein said at least one roller projects into said liquid container, such that a portion of said at least one roller is immersed in the lubricant in said liquid container;

setting a fill level and/or a volume content of lubricant in said liquid container that corresponds to a quantity of lubricant to be transferred onto said endless conveyor by said at least one roller; and changing said fill level and/or said volume content of lubricant in said liquid container to a different fill level and/or a different volume content of lubricant in said liquid container that corresponds to a different quantity of lubricant to be transferred onto said endless conveyor by said at least one roller during shrink wrapping of containers by the shrink-wrapping arrangement.

20. The shrink-wrapping arrangement as claimed in claim 1, wherein said endless conveyor comprises a wire mesh.

\* \* \* \* \*